United States Patent
Ingale et al.

(10) Patent No.: US 11,523,436 B2
(45) Date of Patent: Dec. 6, 2022

(54) METHOD AND USER EQUIPMENT FOR HANDLING RANDOM ACCESS IN WIRELESS COMMUNICATION SYSTEM

(71) Applicant: Samsung Electronics Co., Ltd., Suwon-si (KR)

(72) Inventors: Mangesh Abhimanyu Ingale, Bangalore (IN); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 16/799,072

(22) Filed: Feb. 24, 2020

(65) Prior Publication Data

US 2020/0275494 A1    Aug. 27, 2020

(30) Foreign Application Priority Data

Feb. 22, 2019   (IN) .............................. 201941007072
Jan. 22, 2020   (IN) ............................. 2019 41007072

(51) Int. Cl.
*H04W 74/08*    (2009.01)
*H04B 17/318*   (2015.01)
(Continued)

(52) U.S. Cl.
CPC ...... *H04W 74/0833* (2013.01); *H04B 17/318* (2015.01); *H04L 5/0051* (2013.01);
(Continued)

(58) Field of Classification Search
CPC ........... H04W 74/0833; H04W 72/042; H04W 52/242; H04W 48/04; H04W 48/12;
(Continued)

(56) References Cited

U.S. PATENT DOCUMENTS

2011/0244902 A1    10/2011  Kim et al.
2013/0053103 A1*    2/2013  Kim ........................ H04L 5/003
                                                        455/561

(Continued)

OTHER PUBLICATIONS

3rd Generation Partnership Project; Technical Specification Group Radio Access Network; NR; Radio Resource Control (RRC) protocol specification, 3GPP TS 38.331 V15.4.0 (Dec. 2018). (Year: 2018).*

(Continued)

*Primary Examiner* — Shailendra Kumar
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method for handling random access procedure in wireless communication system is provided. The method includes determining, by a user equipment (UE), that the UE is in one of an idle mode or an inactive mode, acquiring, by the UE, a system information block (SIB) Type1 (SIB1) message from a cell, determining, by the UE, whether the UE supports a frequency band criterion, a spectrum emission criterion, and a bandwidth part criterion based contents of the acquired SIB1 message, and performing, by the UE, one of camping on the cell in response to determining that the UE supports at least one of the frequency band criterion, the spectrum emission criterion, or the bandwidth part criterion, or barring the cell in response to determining that the UE does not support both the frequency band criterion, the spectrum emission criterion, or the bandwidth part criterion.

10 Claims, 12 Drawing Sheets

(51) Int. Cl.
   H04L 5/00      (2006.01)
   H04W 48/04     (2009.01)
   H04W 52/24     (2009.01)
   H04W 72/04     (2009.01)
(52) U.S. Cl.
   CPC .......... H04L 5/0092 (2013.01); H04W 48/04 (2013.01); H04W 52/242 (2013.01); H04W 72/042 (2013.01)
(58) Field of Classification Search
   CPC .... H04W 48/02; H04L 5/0092; H04L 5/0051; H04L 5/0091; H04L 5/0053; H04B 17/318
   See application file for complete search history.

(56)  References Cited

U.S. PATENT DOCUMENTS

| | | | |
|---|---|---|---|
| 2017/0118701 | A1 | 4/2017 | Kim et al. |
| 2019/0215861 | A1* | 7/2019 | Son .................. H04W 72/14 |
| 2019/0222367 | A1* | 7/2019 | Tseng ................ H04W 72/042 |
| 2020/0245330 | A1* | 7/2020 | Jiang ................ H04W 72/0453 |
| 2020/0266959 | A1* | 8/2020 | Yi .................... H04L 5/001 |
| 2021/0195449 | A1* | 6/2021 | Yi .................... H04B 17/318 |

OTHER PUBLICATIONS

Samsung Electronics, Change Request: Correction to SI Reqeust Procedure, 3GPP TSG-RAN2 105, Athens, Greece, Feb. 25-Mar. 1, 2019, R2-1900124 . (Year: 2019).*

3rd Generation Partnership Project; Technical Specification Group Radio Access Network; NR; Radio Resource Control (RRC) protocol specification3GPP TS38.331 V15.5.1 (Apr. 2019). (Year: 2019).*

3rd Generation Partnership Project; Technical Specification Group Radio Access Network; NR; Medium Access Control (MAC) protocol specification, 3GPP TS 38.321 V15.4.0 (Dec. 2018). (Year: 2018).*

3rd Generation Partnership Project; Technical Specification Group Radio Access Network; NR; Radio Resource Control (RRC) protocol specification (Release 15), 3GPP TS 38.331 V15.4.0 (Dec. 2018), Jan. 14, 2019.

"Correction to SI Request Procedure", 3GPP TSG-RAN2 105, Athens, Greece, Feb. 25-Feb. 14, 2019, R2-1900124.

International Search Report dated Jun. 22, 2020, issued in International Application No. PCT/KR2020/002637.

3rd Generation Partnership Project; Technical Specification Group Radio Access Network; NR; Medium Access Control (MAC) protocol specification; 3GPP TS 38.321, V15.5.0. (Release 15), Mar. 2019.

3rd Generation Partnership Project; Technical Specification Group Radio Access Network; NR; Radio Resource Control (RRC) protocol specification; 3GPP TS 38.331, V15.5.1. (Release 15), Apr. 2019.

Indian Office Action dated Aug. 6, 2021, issued in a counterpart an Indian Application No. 201941007072.

3rd Generation Partnership Project; Technical Specification Group Radio Access Network; NR; Radio Resource Control (RRC) protocol specification, 3GPP TS 38.331 V15.4.0, Dec. 2018. (Release 15).

3rd Generation Partnership Project; Technical Specification Group Radio Access Network; NR; User Equipment (UE) procedures in Idle mode and RRC Inactive state, 3GPP TS 38.304 V15.2.0, Dec. 2018. (Release 15).

3rd Generation Partnership Project; Technical Specification Group Radio Access Network; NR; Medium Access Control (MAC) protocol specification, 3GPP TS 38.321 V15.4.0, Dec. 2018. (Release 15).

* cited by examiner

METHOD AND USER EQUIPMENT FOR HANDLING RANDOM ACCESS IN WIRELESS COMMUNICATION SYSTEM

CROSS-REFERENCE TO RELATED APPLICATION(S)

This application is based on and claims priority under 35 U.S.C. § 119(a) of an Indian Provisional patent application number 201941007072, filed on Feb. 22, 2019, in the Indian Patent Office, and of an Indian Complete patent application number 201941007072, filed on Jan. 22, 2020, in the Indian Patent Office, the disclosure of each of which is incorporated by reference herein in its entirety.

BACKGROUND

1. Field

The disclosure relates to a wireless communication system. More particularly, the disclosure relates to a method and a user equipment (UE) for handling random access procedure in the wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Several broadband wireless technologies have been developed to meet the growing number of broadband subscribers and to provide more and better applications and services. The second generation wireless communication system has been developed to provide voice services while ensuring the mobility of users. The third generation wireless communication system supports not only the voice service but also data service. Further, the fourth wireless communication system has been developed to provide high-speed data service. However, currently, the fourth generation wireless communication system suffers from lack of resources to meet the growing demand for high speed data services.

Thus, a fifth generation wireless communication system is being developed to meet the growing demand for high speed data services, support ultra-reliability and low latency applications.

The fifth generation wireless communication system will be deployed not only in lower frequency bands e.g. 500 MHz to 10 GHz bands, but also in higher frequency (mm-Wave) bands, e.g., 10 GHz to 100 GHz bands, so as to accomplish higher data rates. In order to mitigate propagation loss of the radio waves and increase the transmission distance, the beamforming, massive multiple-input multiple-output (MIMO), full dimensional MIMO (FD-MIMO), array antenna, an analog beam forming, large scale antenna techniques are being considered in the design of the fifth generation wireless communication system. In addition, the fifth generation wireless communication system is expected to address different use cases having quite different requirements in terms of data rate, latency, reliability, mobility etc. However, the design of an air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced mobile broadband (eMBB), massive machine type communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the internet of things (IoT)/internet of everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fourth generation wireless communication system like long term evolution (LTE), enhanced node B (eNB) or base station communicates with the UE either in frequency division duplex (FDD) mode or time division duplex (TDD) mode. In an FDD mode, there is one channel/carrier for transmission from the eNB to the UE called the Downlink (DL) carrier and a separate paired channel/carrier called an uplink (UL) carrier for receiving at the eNB transmissions from several UEs. In the TDD mode, there is single channel/carrier for transmission from the eNB to the UE and for reception of multiple UE transmissions on the same carrier. The TDD carrier is bidirectional such that the transmission from the eNB and transmission from the UEs is multiplexed in time. In the IDLE state, if the carrier meets the criteria for cell selection, the UE camps on the carrier to perform IDLE state operations. The UE if it supports both FDD mode and TDD mode, in the IDLE state either camps on a cell served by a DL carrier in FDD mode or on a TDD bidirectional carrier by monitoring the DL timeslots.

FIG. 1 shows an initial access in LTE where the UE in the idle state after performing cell search and acquiring the DL synchronization needs to acquire the cell specific parameters i.e. cell access parameters of the detected cell according to the related art.

These cell access parameters are periodically broadcasted and commonly referred as system information (SI). On acquiring the SI related to cell access and idle state mobility the UE can camp on the cell which has met the cell selection criteria. The UE performs random access procedure on the UL carrier in FDD mode or UL timeslots of TDD carrier served by the camped cell to transition to the connected state where radio resources are provided to the UE for data transfer.

The random access procedure commonly referred as RACH involves transmission of a known signal sequence called preamble on time-frequency resource of the UL carrier in the FDD mode or UL timeslot of the TDD bidirectional carrier in the TDD mode. The time-frequency resource on which preamble is transmitted by the UE is called PRACH resource. The eNB detects the transmitted preamble on the PRACH resource and responds with random access response (RAR). The random access procedure in LTE is either 4-step contention based random access (CBRA) or 2-step contention free random access (CFRA) which is well known art. In both CBRA and CFRA the first step involves the transmission of preamble the difference being in CBRA the preamble is randomly selected from a set of preambles while in CFRA the preamble is pre-assigned to the UE. The random access procedure is common procedure for FDD and TDD modes, irrespective of the cell size and the number of serving cells when carrier aggregation (CA) is configured. In carrier aggregation (CA), two or more component carriers (CCs) are aggregated in DL and/or UL. The UE may simultaneously receive or transmit on one or multiple CCs depending on its capabilities. The CA is supported for both contiguous CCs in a frequency band and non-contiguous CCs of two different frequency bands. When the CA is deployed frame timing and system frame number (SFN) are aligned across CCs that can be aggregated. The random access procedure is performed for the following events, a) Initial access from idle as shown in FIG. 1, b) RRC Connection Re-establishment procedure, c) handover event, d) DL data arrival during connected state requiring RACH, e) UL data arrival during connected state requiring RACH and f) for positioning purpose during connected state.

The fifth generation wireless communication system i.e. NR system is provisioned either with a UL/DL carrier pair (FDD mode) or a bidirectional carrier (TDD mode). The UE may be configured with additional UL carrier called supplementary Uplink (SUL). The SUL differs from the CA uplink in that the UE may be scheduled to transmit either on the SUL or on the normal uplink (NUL) of the FDD carrier pair or the TDD bidirectional carrier, but not on both at the same time. The random access procedure in the NR system is similar to the RACH in the LTE. In addition to the events applicable in the LTE system, there are additional events in the NR system such as, a) SR failure, b) request by RRC upon synchronous reconfiguration, c) transition from inactive state, d) to establish time alignment at SCell addition, e) request for Other SI and f) beam failure recovery for which RACH is triggered. In the NR system the carrier on which the UE performs RACH can be the paired UL carrier (i.e. NUL) in FDD mode or another UL carrier, if configured. This additional UL carrier not paired with the DL carrier is called supplementary uplink (SUL) carrier. Similarly, in the TDD mode the UE may perform RACH on the UL timeslots of the bidirectional carrier or another supplementary UL carrier (SUL) if configured. The term normal UL (UL) is interchangeably used with the term UL i.e. paired UL carrier with DL carrier in FDD mode or the bi-directional carrier in TDD mode in the disclosure. The UE radio capability determines the frequency bands it supports and the modes of communications i.e. FDD and/or TDD mode. For the RACH triggering event such transition from idle/inactive state to connected wherein the UE camped on the cell performs random access it is not straightforward whether the UE performs RACH on NUL or SUL, if configured. Further, if the SIB1 broadcast from the cell includes SUL parameters it is not straightforward the criteria to consider if the cell is SUL configured.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and user equipment (UE) for handling random access procedure in a wireless communication system.

Additional aspects will be set forth in part in the description which follows and, in part, will be apparent from the description, or may be learned by practice of the presented embodiments.

In accordance with an aspect of the disclosure, a method for handling a random access procedure in a wireless cellular system is provided. The method includes determining, by a UE, that the UE is in one of an idle mode or an inactive mode. Further, the method includes acquiring, by the UE, a system information block (SIB) Type 1 (SIB1) message from a cell. Further, the method includes determining, by the UE, whether the UE supports a frequency band criterion, a spectrum emission criterion, and a bandwidth part criterion based on contents of the acquired SIB1 message. The content can be, for example, but not limited to a downlink configuration common parameter and an uplink configuration common parameter. Examples of the downlink configuration common parameters include downlink carrier frequency, initial downlink bandwidth part (BWP), modification period of broadcast channel, paging related configuration etc. Examples of the uplink configuration common parameters include an uplink carrier frequency, an initial uplink BWP etc. Further, the method includes performing, by the UE, one of camping on the cell or barring the cell in response to determining the contents of the acquired SIB1 message. Further, the method includes determining, by the UE, whether the camped cell is configured with a supplementary uplink (SUL) based on parameters associated with the SUL included in the acquired SIB1 message. The parameter can be, for example, a supplementary uplink configuration common parameter. The method further includes determining a carrier selection criterion, by the UE, wherein the UE initiates a random access procedure on one of a normal uplink (NUL) or the SUL if the camped cell is configured with the SUL based on the carrier selection criterion.

In an embodiment, the frequency band criterion indicates that the UE supports at least one frequency band indicated in a frequency band list for one of an uplink (UL), a downlink (DL), or a SUL.

In an embodiment, the spectrum emission criterion indicates that the UE supports at least one additional spectrum emission in a frequency band list for one of the UL or the SUL.

In an embodiment, the bandwidth part criterion indicates that the UE supports at least one of the bandwidth of initial UL BWP for an UL indicated in a location and bandwidth field of the UL, the bandwidth of initial DL BWP for a DL indicated in a location and bandwidth field of the DL, or the bandwidth of initial UL BWP for a SUL indicated in a location and bandwidth field of the SUL.

In an embodiment, the frequency band criterion, the spectrum emission criterion and the bandwidth part criterion are determined based on the contents of the SIB1 message acquired by the UE from the cell.

In an embodiment, camping on the cell is determined in response to satisfying the frequency band criterion, the spectrum emission criterion and the bandwidth part criterion.

In an embodiment, a configuration of the SUL on the camped cell is determined in response to identifying the parameters associated with the SUL included in the acquired SIB1 message.

In an embodiment, the random access procedure is performed on the camped cell, by triggering to move to a connected mode and determining, by the UE, whether the camped the cell is configured with the SUL and the carrier selection criterion.

In an embodiment, the camped cell is configured with the SUL, if the UE supports one or more of the frequency bands indicated in the Frequency Band List for the SUL, the UE supports at least one additional spectrum emission in a NR-NSPmaxList within the frequency band list of frequency info UL-SIB for SUL, and the UE supports the bandwidth of an initial uplink BWP indicated in a location and bandwidth fields for the SUL based on identifying the parameters associated with SUL included in the acquired SIB1 message.

In an embodiment, if a cell is configured with SUL the carrier selection criterion indicates the UE selects the SUL for performing the random access procedure when a reference signal received power (RSRP) of a DL path loss reference is less than rsrp-ThresholdSSB-SUL else the UE selects the NUL.

In accordance with another aspect of the disclosure, a UE for handling a random access procedure in a wireless cellular system is provided. The UE includes a processor coupled with a memory. The processor is configured to determine that the UE is in one of an idle mode or an inactive mode. The processor is configured to acquire a SIB1 message from a cell and determine whether the UE supports a frequency band criterion, a spectrum emission criterion and a bandwidth part criterion based on the SIB1 message. In response to determining that the UE supports at least one of the frequency band criterion, the spectrum emission criterion, or the bandwidth part criteria, the processor is configured to camp on the cell. In response to determining that the UE does not support both the frequency band criterion, the spectrum emission criterion, and the bandwidth part criterion, the processor is configured to bar the cell. Further the processor is configured to determine whether the camped cell is configured with SUL based on the parameters associated with SUL included in the acquired SIB1 message. In response to determining the camped cell is configured with SUL and the carrier selection criteria is satisfied, the processor is configured to initiate a random access procedure on the SUL. In response to determining the camped cell configured with SUL and the carrier selection criteria is not satisfied, the processor is configured to initiate a random access procedure on the NUL.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
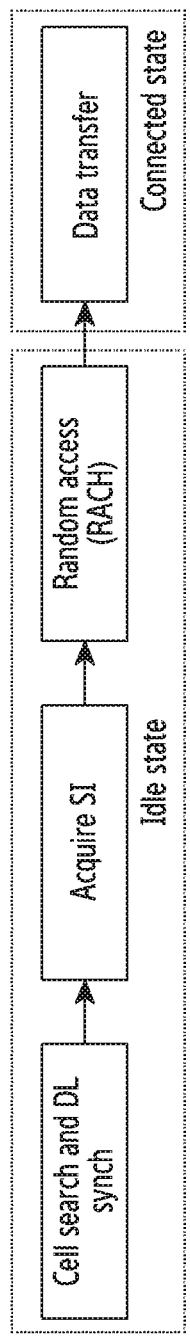
FIG. 1 shows an initial access in long term evolution (LTE) where a user equipment (UE) is in an idle state after performing cell search and acquiring downlink (DL) synchronization needs to acquire the cell specific parameters according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein achieve a method for handling a random access procedure in a wireless cellular system. The method includes determining, by a UE, that the UE is in one of an idle mode and an inactive mode. Further, the method includes acquiring, by the UE, a system information block (SIB) Type1 (SIB1) message from a cell. Further, the method includes determining, by the UE, whether the UE supports a frequency band criterion, a spectrum emission criterion, and a bandwidth part criterion based on contents of the acquired SIB1 message. Further, the method includes performing, by the UE, one of camping on the cell in response to determining that the UE supports at least one of the frequency band criterion, the spectrum emission criterion, and the bandwidth part criterion, and barring the cell in response to determining that the UE does not support both the frequency band criterion, the spectrum emission criterion, and the bandwidth part criterion. Further, the method includes determining, by the UE, whether the camped cell is configured with SUL based on the parameters associated with SUL included in the acquired SIB1 message. The method further includes determining a carrier selection criterion, by the UE, wherein the UE initiates a random access procedure on one of: the normal uplink (NUL) or the supplementary uplink (SUL) if the camped cell is configured with SUL based on carrier selection criteria.

Various embodiments of the proposed method are adopted in the TS 38.331 v 15.5.1 standard and TS 38.321 v 15.5.0 standard.

Referring now to the drawings, and more particularly to FIGS. 2 through 11, where similar reference characters denote corresponding features consistently throughout the figures, there are shown preferred embodiments.

Figure 2:
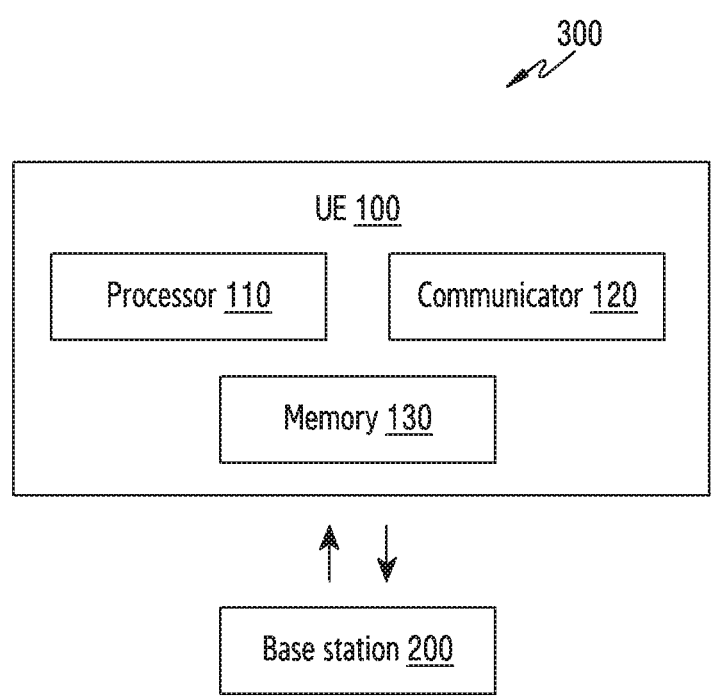
FIG. 2 is schematic view of a wireless cellular system for handling a random access procedure, according to an embodiment of the disclosure.

FIG. 2 is schematic view of a wireless communication system (300) for handling a random access procedure, according to an embodiment of the disclosure.

Referring to FIG. 2, the wireless communication system (300) includes a UE (100) and a base station (200). The UE (100) can be, for example but not limited to a unmanned aerial vehicle (UAV), an airplane, a cellular phone, a tablet, a smart phone, a laptop, a personal digital assistant (PDA), a global positioning system, a multimedia device, a video device, an internet of things (IoT) device, a smart watch, a game console, or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The base station (200) may also be referred to as a base transceiver station, a radio base station, a radio transceiver, a transceiver function, a basic service set (BSS), an extended service set (ESS), an eNB, a gNB or the like.

In an embodiment, the UE (100) includes a processor (110), a communicator (120), and a memory (130). The processor (110) is coupled with the memory (130) and the communicator (120). The processor (110) is configured to execute instructions stored in the memory (130) and to perform various processes. The communicator (120) is configured for communicating internally between internal hardware components and with external devices via one or more networks and/or base station (200).

The memory (130) stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

In an embodiment, the processor (110) is configured to determine that the UE (100) is in one of an idle mode and an inactive mode. Based on the detection, the processor (110) is configured to acquire the SIB Type1 (SIB1) message from a cell. Based on contents of the acquired SIB1 message, the processor (110) is configured to determine whether the UE (100) supports a frequency band criterion, a spectrum emission criterion and a bandwidth part criterion. The content can be, for example, but not limited to a downlink configuration common parameter and an uplink configuration common parameter. Examples of the downlink configuration common parameters include downlink carrier frequency, initial downlink BWP, modification period of broadcast channel, paging related configuration etc. Examples of the Uplink configuration common parameters include an uplink carrier frequency, an initial uplink BWP etc.

In an embodiment, the frequency band criterion indicates that the UE (100) supports at least one frequency band indicated in a frequency band list for one of an uplink (UL), a downlink (DL) and a SUL. In an embodiment, the bandwidth part criterion indicates that the UE (100) supports at least one of: the bandwidth of initial UL bandwidth part (BWP) for an UL indicated in a location and bandwidth field of the UL, the bandwidth of initial DL BWP for a DL indicated in a location and bandwidth field of the DL, and the bandwidth of initial UL BWP for a SUL indicated in a location and bandwidth field of the SUL. In an embodiment, the spectrum emission criterion indicates that the UE (100) supports at least one additional spectrum emission in a frequency band list for one of the UL and the SUL.

In an embodiment, the frequency band criterion, the spectrum emission criterion and the bandwidth part criterion are determined by determining the contents of the SIB1 message acquired by the UE (100) from the cell.

In an embodiment, in response to determining that the UE (100) supports at least one of the frequency band criterion, the spectrum emission criterion and the bandwidth part criterion, the processor (110) is configured to camp on the cell. In another embodiment, in response to determining that the UE (100) does not support both the frequency band criterion, the spectrum emission criterion and the bandwidth part criterion, the processor (110) is configured to bar the cell.

In an embodiment, the camping on the cell is determined in response to satisfying the frequency band criterion, the spectrum emission criterion and the bandwidth part criterion. In an embodiment, the configuration of the SUL on the camped cell is determined by identifying the parameters associated with the SUL included in the acquired SIB1 message.

Further, the processor (110) is configured to determine whether the camped cell is configured with the SUL based on the parameters associated with the SUL included in the acquired SIB1 message. The parameter can be, for example, a supplementary uplink configuration common parameter. Further, the processor (110) is configured to determine a carrier selection criterion. Further, the processor (110) initiates a random access procedure on one of: the normal uplink (NUL) or the supplementary uplink (SUL) if the camped cell is configured with the SUL based on carrier selection criterion.

In order to perform the random access procedure, the processor (110) is configured to camp on the cell and detect a trigger to move to a connected mode. Further, the processor (110) is configured to determine whether the camped cell is configured with the SUL and the UE (100) supports the carrier selection criterion.

In an embodiment, the processor (110) is configured to determine whether the camped cell is configured with the SUL based on parameters associated with the SUL included in the acquired SIB1 message. Further, the processor (110) is configured to determine whether the UE (100) supports the carrier selection criterion. Further, the processor (110) is configured to initiate the random access procedure on one of the SUL and the NUL in response to determining that the UE supports the carrier selection criterion and the camped cell is configured with the SUL. In case, in response to determining that the camped cell is not configured with the SUL, the processor (110) is configured to initiate the random access procedure on the NUL.

In an embodiment, the camped cell is configured with the SUL, if the UE (100) supports one or more of the frequency bands indicated in the Frequency Band List for the SUL, the UE (100) supports at least one additional spectrum emission in a NR-NSPmaxList within the frequency band list of frequency info UL-SIB for the SUL, and the UE (100) supports the bandwidth of an initial uplink BWP indicated in a location and bandwidth fields for the SUL based on identifying the parameters associated with the SUL included in the acquired SIB1 message.

In response to determining the camped cell is configured with the SUL and the carrier selection criteria is satisfied, the processor (110) is configured to initiate the random access procedure on the SUL. In response to determining the camped cell is configured with the SUL and the carrier selection criteria is not satisfied, the processor (110) is configured to initiate the random access procedure on the NUL.

In an embodiment, if the cell is configured with SUL then, the carrier selection criterion indicates the UE (100) selects the SUL for performing the random access procedure when a reference signal received power (RSRP) of a DL path loss reference is less than rsrp-ThresholdSSB-SUL (i.e., threshold associated with SUL).

Although the FIG. 2 shows various hardware components of the wireless communication system (300) but it is to be understood that other embodiments are not limited thereon. In other embodiments, the wireless communication system (300) may include less or more number of components. Further, the labels or names of the components are used only for illustrative purpose and does not limit the scope of the disclosure. One or more components can be combined together to perform same or substantially similar function to handle the random access procedure.

Figure 3:
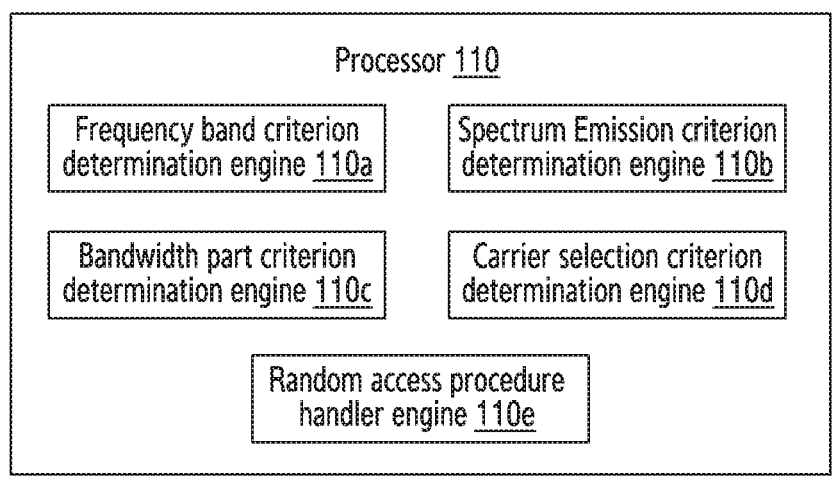
FIG. 3 shows various hardware components of a processor included in a UE, according to an embodiment of the disclosure.

FIG. 3 shows various hardware components of the processor (110) included in the UE (100), according to an embodiment of the disclosure.

Referring to FIG. 3, the processor (110) includes a frequency band criterion determination engine (110a), a spectrum emission criterion determination engine (110b), a bandwidth part criterion determination engine (110c), a carrier selection criterion determination engine (110d), and a random access procedure handler engine (110e).

In an embodiment, the random access procedure handler engine (110e) is configured to determine that the UE (100) is in one of the idle mode and the inactive mode. Based on the detection, the random access procedure handler engine (110e) is configured to acquire the SIB1 message from the cell. Based on the SIB1 message, the random access procedure handler engine (110e) is configured to determine whether the UE (100) supports the frequency band criterion, the spectrum emission criterion, and the bandwidth part criterion using the frequency band criterion determination engine (110a), the spectrum emission criterion determination engine (110b) and the bandwidth part criterion determination engine (110c).

In an embodiment, in response to determining that the UE (100) supports at least one of the frequency band criterion, the spectrum emission criterion and the bandwidth part criterion, the random access procedure handler engine (110e) is configured to camp on the cell. In another embodiment, in response to determining that the UE (100) does not support both the frequency band criteria, the spectrum emission criterion and the bandwidth part criterion, the random access procedure handler engine (110e) is configured to bar the cell.

Further, the random access procedure handler engine (110e) is configured to determine whether the camped cell is configured with the SUL based on the parameters associated with the SUL included in the acquired SIB1 message. Further, the random access procedure handler engine (110e) is configured to determine the carrier selection criterion using the carrier selection criterion determination engine (110d). Further, the random access procedure handler engine (110e) is configured to initiate the random access procedure on one of: the NUL or the SUL if the camped cell is configured with the SUL based on the determined carrier selection criterion.

In response to determining the camped cell is configured with the SUL and the carrier selection criteria is satisfied, the random access procedure handler engine (110e) is configured to initiate the random access procedure on the SUL. In response to determining the camped cell configured with the SUL and the carrier selection criteria is not satisfied, the random access procedure handler engine (110e) is configured to initiate a random access procedure on the NUL.

Although the FIG. 3 shows various hardware components of the processor (110) but it is to be understood that other embodiments are not limited thereon. In other embodiments, the processor (110) may include less or more number of components. Further, the labels or names of the components are used only for illustrative purpose and does not limit the scope of the disclosure. One or more components can be combined together to perform same or substantially similar function to handle the random access procedure in the wireless communication system (300).

According to various embodiments, a method for handling a random access procedure in a wireless communication system, the method comprising: determining, by a user equipment (UE), that the UE is in one of an idle mode or an inactive mode; acquiring, by the UE, a system information block (SIB) Type 1 (SIB1) message from a cell; determining, by the UE (100), whether the UE supports a frequency band criterion, a spectrum emission criterion, and a bandwidth part criterion based on contents of the acquired SIB1 message; and performing, by the UE, one of: camping on the cell in response to determining that the UE supports at least one of the frequency band criterion, the spectrum emission criterion, or the bandwidth part criterion, or barring the cell in response to determining that the UE does not support the frequency band criterion, the spectrum emission criterion, or the bandwidth part criterion.

In some embodiments, wherein the frequency band criterion indicates that the UE supports at least one frequency band indicated in a frequency band list for one of:

an uplink (UL), a downlink (DL), or a supplementary uplink (SUL).

In some embodiments, the spectrum emission criterion indicates that the UE supports at least one spectrum emission in a frequency band list for one of: an uplink (UL) or a supplementary uplink (SUL).

In some embodiments, the bandwidth part criterion indicates that the UE supports at least one of: a bandwidth of initial uplink (UL) bandwidth part (BWP) for an UL indicated in a location and bandwidth field of the UL, a bandwidth of initial downlink (DL) BWP for a DL indicated in a location and bandwidth field of the DL, or the bandwidth of initial UL BWP for a supplementary uplink (SUL) indicated in a location and bandwidth field of the SUL.

In some embodiments, the frequency band criterion, the spectrum emission criterion, and the bandwidth part criterion are determined based on the contents of the SIB1 message acquired by the UE from the cell.

In some embodiments, the camping on the cell is determined in response to satisfying the frequency band criterion, the spectrum emission criterion, and the bandwidth part criterion.

In some embodiments, a configuration of a supplementary uplink (SUL) on the camped cell is determined by identifying parameters associated with the SUL included in the acquired SIB1 message.

In some embodiments, the method further comprises: determining, by the UE, whether the camped cell is configured with a supplementary uplink (SUL) based on parameters associated with the SUL included in the acquired SIB1 message; determining, by the UE, whether the UE supports a carrier selection criterion; and initiating the random access procedure on one of the SUL or a normal uplink (NUL) in response to determining that the UE supports the carrier selection criterion and the camped cell is configured with the SUL.

In some embodiments, the method further comprises initiating the random access procedure on the NUL in response to determining that the camped cell is not configured with the SUL.

In some embodiments, the random access procedure is performed on the camped cell by: detecting, by the UE, a trigger to move to a connected mode; and determining, by the UE, whether the camped cell is configured with the SUL and the UE supports the carrier selection criterion.

In some embodiments, if the cell is configured with the SUL, the carrier selection criterion indicates that the UE selects the SUL for performing the random access procedure when a reference signal received power (RSRP) of a downlink (DL) path loss reference is less than a threshold associated with the SUL.

In some embodiments, if the cell is configured with the SUL, the carrier selection criterion indicates the UE selects a NUL for performing the random access procedure when a reference signal received power (RSRP) of a downlink (DL) path loss reference is greater than a threshold associated with the SUL.

In some embodiments, the camped cell is configured with the SUL, if the UE supports one or more frequency bands indicated in a frequency band list for the SUL, the UE supports at least one spectrum emission in a NR-NSP-maxList within the frequency band list of frequency info UL-SIB for the SUL, or the UE supports a bandwidth of an initial uplink (UL) bandwidth part (BWP) indicated in a location and bandwidth fields for the SUL based on identifying parameters associated with the SUL included in the acquired SIB1 message.

In some embodiments, if the cell is configured with the SUL, the carrier selection criterion indicates that the UE selects the SUL for performing the random access procedure when a reference signal received power (RSRP) of a downlink (DL) path loss reference is less than a threshold associated with the SUL.

In some embodiments, if the cell is configured with the SUL, the carrier selection criterion indicates the UE selects a NUL for performing the random access procedure when a reference signal received power (RSRP) of a downlink (DL) path loss reference is greater than a threshold associated with the SUL.

According to various embodiments, a user equipment (UE) for handling a random access procedure in a wireless communication system, the UE comprising: a memory; and a processor, operatively coupled with the memory, configured to: determine that the UE is in one of an idle mode or an inactive mode; acquire a system information block (SIB) Type 1 (SIB1) message from a cell; determine whether the UE supports a frequency band criterion, a spectrum emission criterion, and a bandwidth part criterion based on contents of the acquired SIB1 message; and perform one of:

camp on the cell in response to determining that the UE supports at least one of the frequency band criterion, the spectrum emission criterion, or the bandwidth part criterion, or bar the cell in response to determining that the UE does not support all the frequency band criterion, the spectrum emission criterion, or the bandwidth part criterion.

In some embodiments, the frequency band criterion indicates that the UE supports at least one frequency band indicated in a frequency band list for one of an uplink (UL), a downlink (DL), or a supplementary uplink (SUL).

In some embodiments, the spectrum emission criterion indicates that the UE supports at least one spectrum emission in a frequency band list for one of an uplink (UL) or a supplementary uplink (SUL).

In some embodiments, the bandwidth part criterion indicates that the UE supports at least one of a bandwidth of initial uplink (UL) bandwidth part (BWP) for an UL indicated in a location and bandwidth field of the UL, a bandwidth of initial downlink (DL) BWP for a DL indicated in a location and bandwidth field of the DL, or the bandwidth of initial UL BWP for a supplementary uplink (SUL) indicated in a location and bandwidth field of the SUL.

In some embodiments, the frequency band criterion, the spectrum emission criterion, and the bandwidth part criterion are determined based on the contents of the SIB1 message acquired by the UE from the cell.

In some embodiments, the camping on the cell is determined in response to satisfying the frequency band criterion, the spectrum emission criterion, and the bandwidth part criterion.

In some embodiments, a configuration of a supplementary uplink (SUL) on the camped cell is determined by identifying parameters associated with the SUL included in the acquired SIB1 message.

In some embodiments, the processor is configured to: determine whether the camped cell is configured with a supplementary uplink (SUL) based on parameters associated with the SUL included in the acquired SIB1 message; determine whether the UE supports a carrier selection criterion; and initiate the random access procedure on one of the SUL and a normal uplink (NUL) in response to determining that the UE supports the carrier selection criterion and the camped cell is configured with the SUL.

In some embodiments, the processor is configured to initiate the random access procedure on the NUL in response to determining that the camped cell is not configured with the SUL.

In some embodiments, the random access procedure is performed on the camped cell by: detecting a trigger to move to a connected mode; and determining whether the camped cell is configured with the SUL and the UE supports the carrier selection criterion.

In some embodiments, if the cell is configured with the SUL, the carrier selection criterion indicates that the UE selects the SUL for performing the random access procedure when a reference signal received power (RSRP) of a downlink (DL) path loss reference is less than a threshold associated with the SUL.

In some embodiments, if the cell is configured with the SUL, the carrier selection criterion indicates that the UE selects a NUL for performing the random access procedure when a reference signal received power (RSRP) of a downlink (DL) path loss reference is greater than a threshold associated with the SUL.

In some embodiments, the camped cell is configured with the SUL, if the UE supports one or more frequency bands indicated in a frequency band list for the SUL, the UE supports at least one spectrum emission in a NR-NSP-maxList within the frequency band list of frequency info UL-SIB for the SUL, or the UE supports a bandwidth of an initial uplink (UL) bandwidth part (BWP) indicated in a location and bandwidth fields for the SUL based on identifying parameters associated with the SUL included in the acquired SIB1 message.

In some embodiments, if the cell is configured with the SUL, the carrier selection criterion indicates that the UE selects the SUL for performing the random access procedure when a reference signal received power (RSRP) of a downlink (DL) path loss reference is less than a threshold associated with the SUL.

In some embodiments, if the cell is configured with the SUL, the carrier selection criterion indicates that the UE selects a NUL for performing the random access procedure when a reference signal received power (RSRP) of a downlink (DL) path loss reference is greater than a threshold associated with the SUL.

Figure 4:
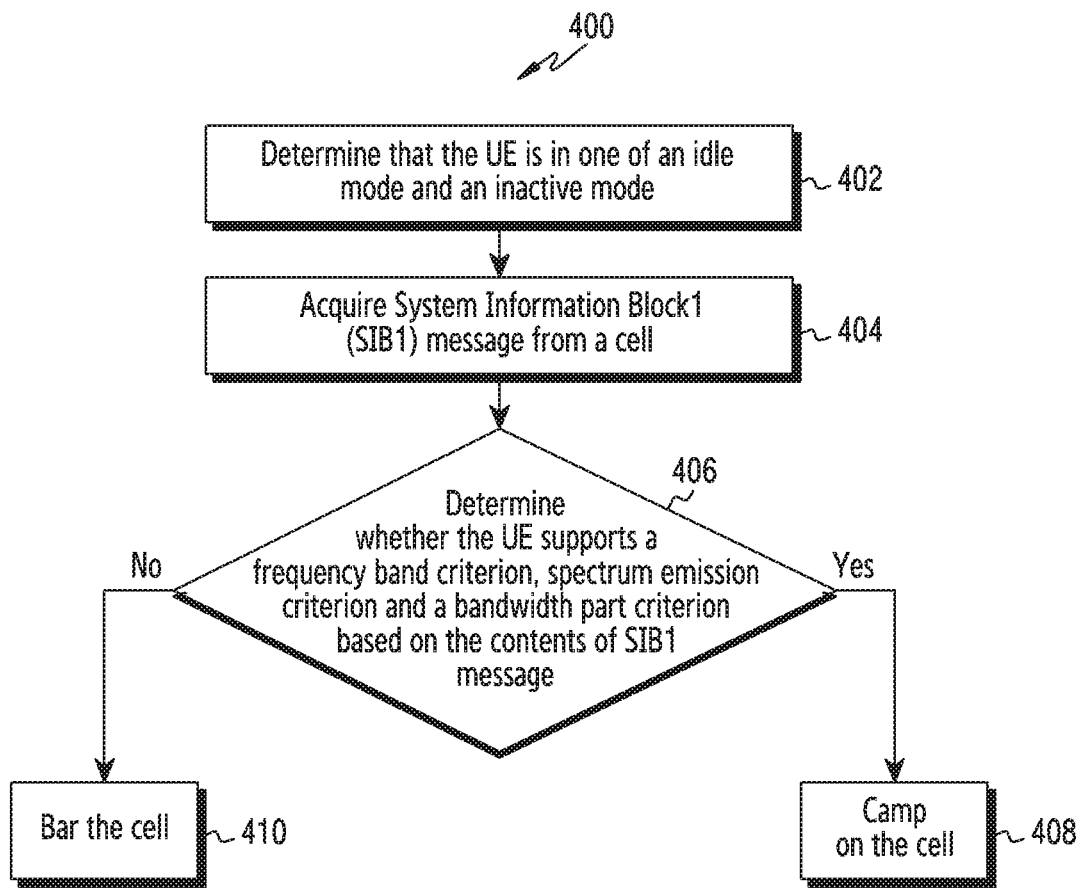
FIG. 4 is a flow chart illustrating a method for handling the random access procedure in the wireless cellular system using a frequency band criterion, a spectrum emission criterion and a bandwidth part criterion, according to an embodiment of the disclosure.

FIG. 4 is a flow chart (400) illustrating a method for handling the random access procedure in the wireless communication system (300) using the frequency band criterion, the spectrum emission criterion and the bandwidth part criterion, according to an embodiment of the disclosure. The operations 402-410 are performed by the processor (110).

At operation 402, the method includes determining that the UE (100) is in one of the idle mode and the inactive mode. At operation 404, the method includes acquire the SIB1 message from the cell. At operation 406, the method includes determining whether the UE (100) supports the frequency band criterion, the spectrum emission criterion and the bandwidth part criterion based on the contents of the SIB1 message. If the UE (100) supports at least one of the frequency band criterion, the spectrum emission criterion and the bandwidth part criterion then, at operation 408, the method includes camping on the cell. If the UE (100) does not support both the frequency band criterion, the spectrum emission criterion and the bandwidth part criterion then, at operation 410, the method includes barring the cell.

Figure 5:
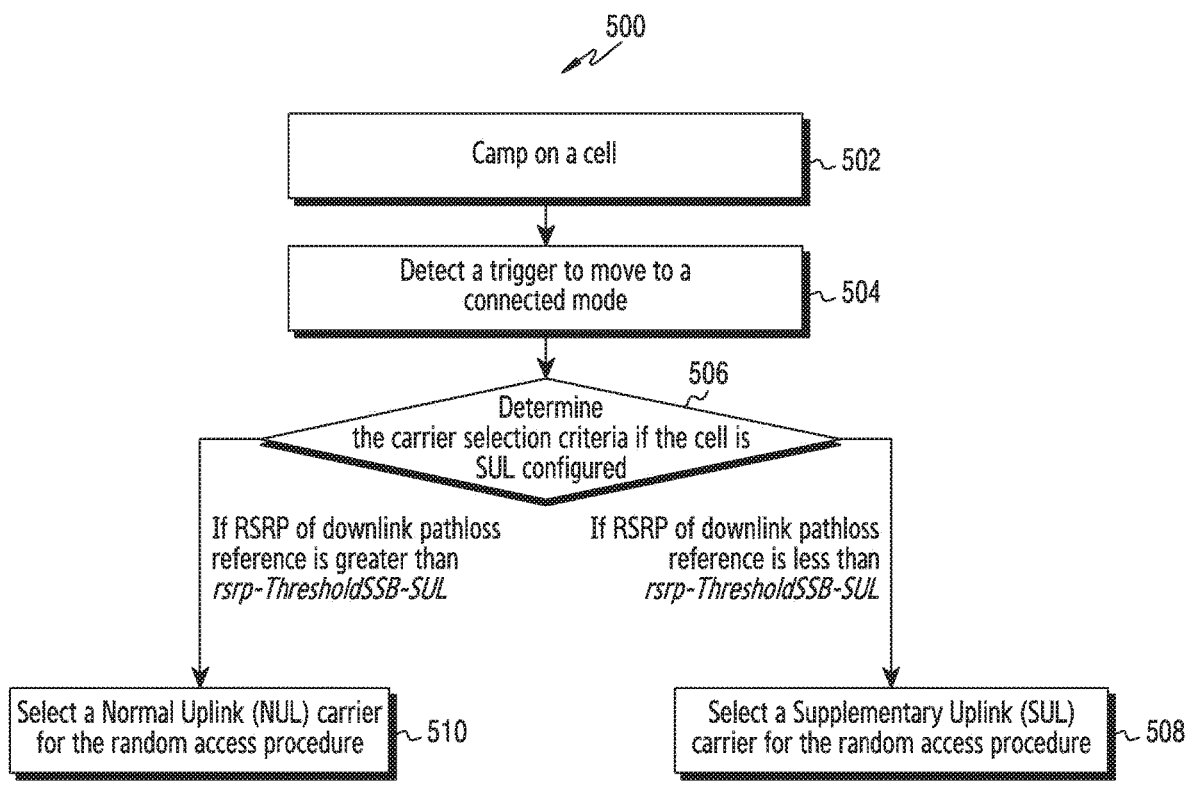
FIG. 5 is a flow chart illustrating a method for handling a random access procedure in the wireless cellular system using the carrier selection criterion, according to an embodiment of the disclosure.

FIG. 5 is a flow chart (500) illustrating a method for handling a random access procedure in the wireless communication system (300) using the carrier selection criterion, according to an embodiment of the disclosure. The operations 502-510 are performed by the processor (110).

At operation 502, the method includes camping of the UE (100) on the cell. At operation 504, the method includes detecting a trigger to move to the connected mode. At operation 506, the method includes determining the carrier selection criterion if the cell is SUL configured. If the RSRP of downlink pathloss reference is less than an rsrp-ThresholdSSB-SUL (i.e., threshold associated with the SUL), then, at operation 508, the method includes selecting the SUL carrier for the random access procedure. If the RSRP of downlink pathloss reference is greater than the rsrp-ThresholdSSB-SUL then, at operation 510, the method includes selecting the NUL carrier for the random access procedure.

Figure 6A:
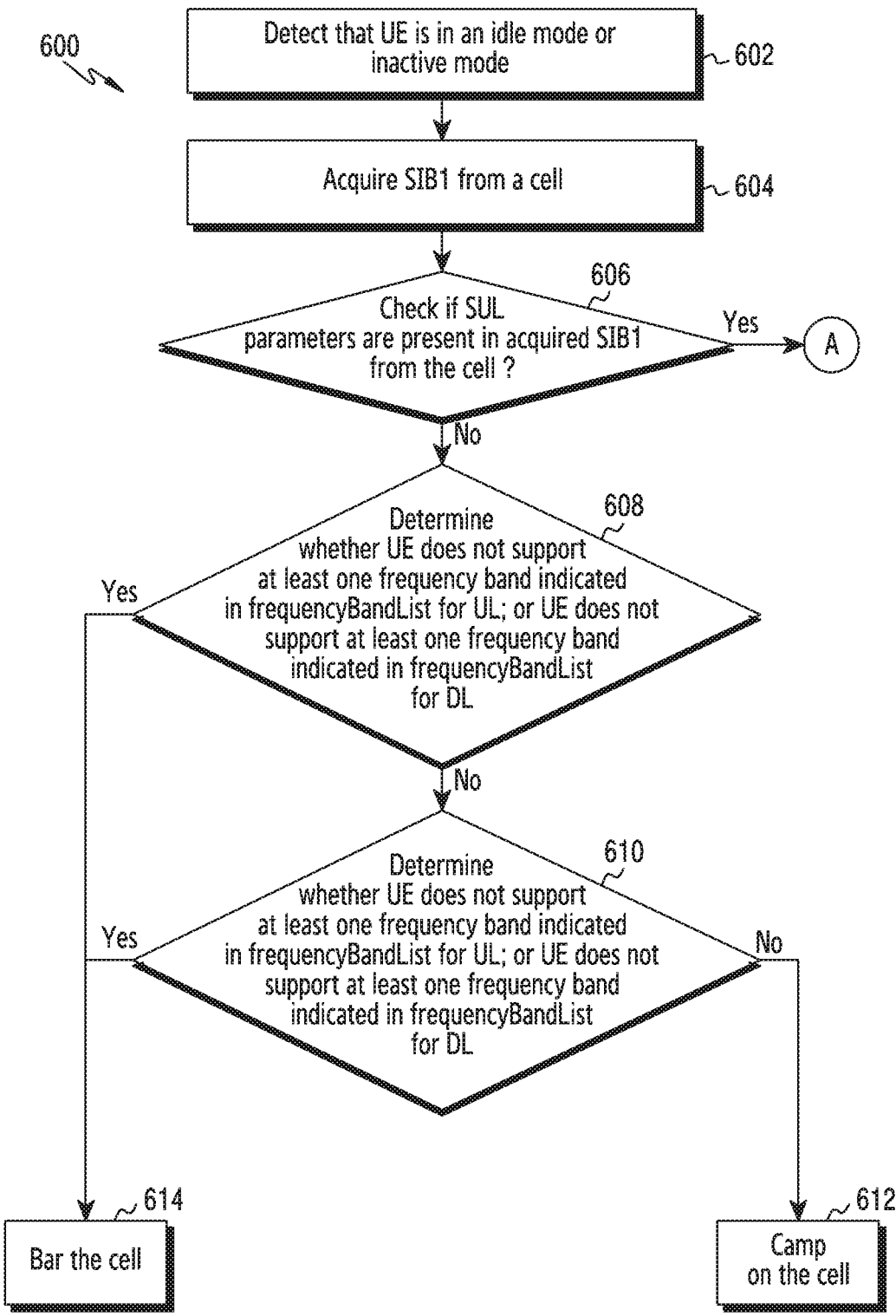
FIGS. 6A and 6B are an example flowchart illustrating various operations for determining camping on cell after acquiring system information block (SIB) Type 1 (SIB1), if the cell is configured with SUL, according to an embodiment of the disclosure.
Figure 6B:
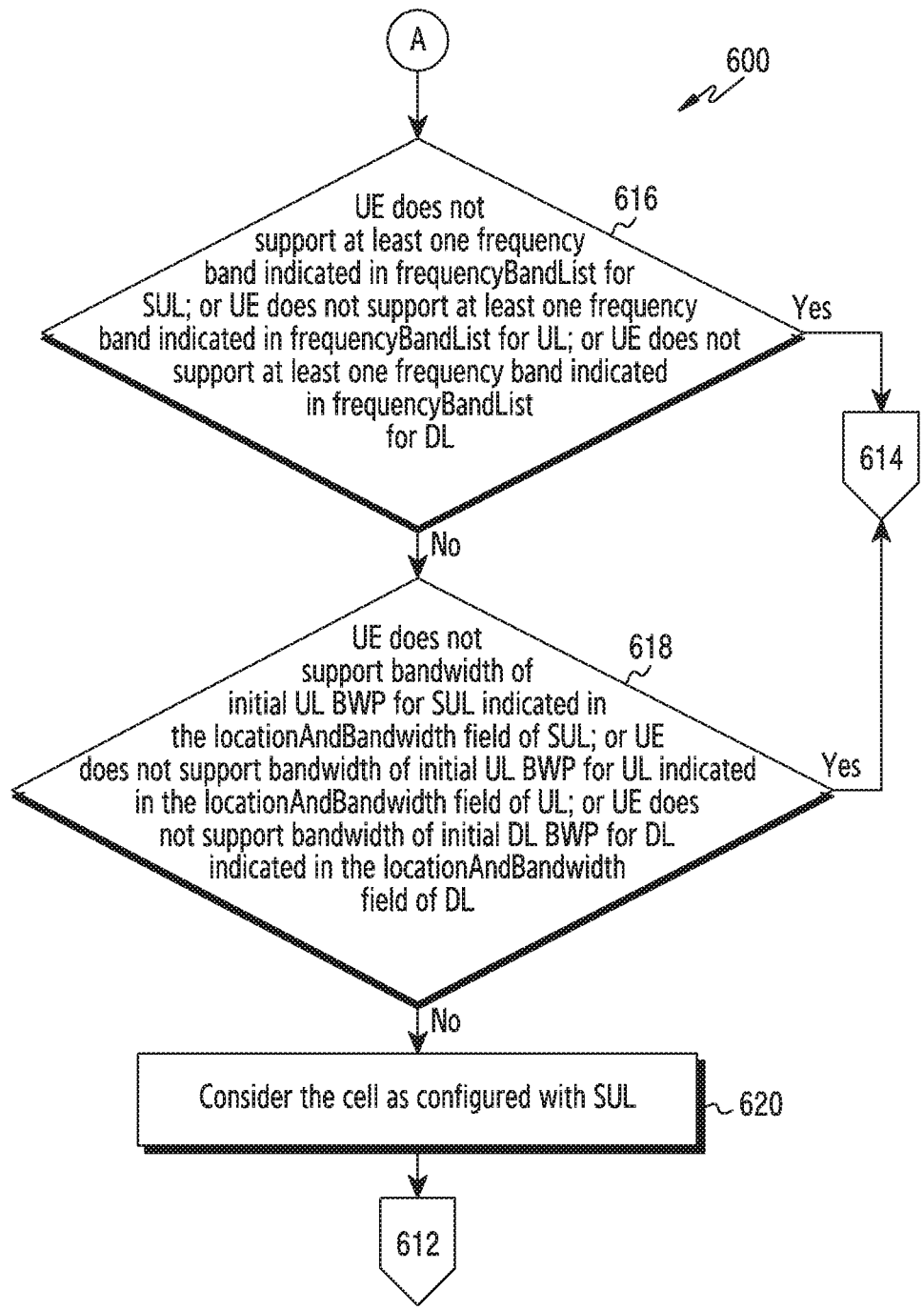

FIGS. 6A and 6B are an example flowchart (600) illustrating various operations for determining camping on the cell after acquiring SIB1, if the cell is configured with the SUL, according to an embodiment of the disclosure.

In an example, at operation 602, the method includes detecting that the UE (100) is in the idle mode or the inactive mode. At operation 604, the method includes acquiring the SIB1 from the cell. At operation 606, the method includes checking if the SUL parameters are present in the SIB1 acquired from the cell. If the SUL parameters are present in acquired SIB1 from in the cell then, at operation 616, the UE (100) does not support at least one frequency band indicated in frequencyBandList for the SUL, or the UE (100) does not support at least one frequency band indicated in frequencyBandList for the UL, or the UE (100) does not support at least one frequency band indicated in frequencyBandList for the DL.

If the SUL parameters are not present in the acquired SIB1 from in the cell then, at operation 608, the method includes determining whether UE (100) does not support at least one frequency band indicated in frequencyBandList for the UL, or the UE (100) does not support at least one frequency band indicated in frequencyBandList for the DL.

If the UE (100) does not support the at least one frequency band indicated in frequencyBandList for the UL, or the UE (100) does not support at least one frequency band indicated in frequencyBandList for the DL then, at operation 614, the method includes barring the cell.

If the UE (100) supports the at least one frequency band indicated in frequencyBandList for the UL, or the UE (100) supports at least one frequency band indicated in frequencyBandList for the DL then, at operation 610, the method includes determining whether the UE (100) does not support bandwidth of the initial UL BWP for the UL indicated in the locationAndBandwidth field of the UL, or the UE (100) does not support bandwidth of initial DL BWP for DL indicated in the locationAndBandwidth field of DL.

If the UE (100) does not support bandwidth of the initial UL BWP for the UL indicated in the locationAndBandwidth field of the UL, or the UE (100) does not support bandwidth of initial DL BWP for DL indicated in the locationAndBandwidth field of DL then, at operation 614, the method includes barring the cell.

If the UE (100) supports the bandwidth of the initial UL BWP for the UL indicated in the locationAndBandwidth field of the UL, or the UE (100) supports the bandwidth of initial DL BWP for DL indicated in the locationAndBandwidth field of DL then, at operation 612, the method includes camping on the cell.

If the UE (100) does not support the at least one frequency band indicated in frequencyBandList for SUL, or the UE (100) does not support at least one frequency band indicated in frequencyBandList for the UL, or the UE (100) does not support at least one frequency band indicated in frequencyBandList for the DL then, at operation 614, the method includes barring the cell.

If the UE (100) supports the at least one frequency band indicated in frequencyBandList for the SUL, or the UE (100) supports the at least one frequency band indicated in frequencyBandList for the UL, or the UE (100) supports at least one frequency band indicated in frequencyBandList for the DL then, at operation 618, the UE (100) does not support bandwidth of initial UL BWP for the SUL indicated in the locationAndBandwidth field of the SUL, or the UE (100) does not support bandwidth of initial UL BWP for the UL indicated in the locationAndBandwidth field of the UL, or the UE (100) does not support bandwidth of initial DL BWP for DL indicated in the locationAndBandwidth field of the DL.

If the UE (100) does not support bandwidth of initial UL BWP for the SUL indicated in the locationAndBandwidth field of the SUL, or the UE (100) does not support bandwidth of initial UL BWP for the UL indicated in the locationAndBandwidth field of the UL, or the UE (100) does not support bandwidth of initial DL BWP for DL indicated in the locationAndBandwidth field of the DL then, at operation 614, the method includes barring the cell.

If the UE (100) supports the bandwidth of initial UL BWP for the SUL indicated in the locationAndBandwidth field of the SUL, or the UE (100) supports the bandwidth of initial UL BWP for the UL indicated in the locationAndBandwidth field of UL, or the UE (100) supports the bandwidth of initial DL BWP for DL indicated in the locationAndBandwidth field of DL then, at operation 620, the method includes considering the cell as configured with the SUL.

The proposed method can be used for camping on the cell and performing RACH based on the following procedures:

If the SUL is configured in the cell, the UE (100) bars the cell if it does not support at least one frequency band indicated in frequencyBandList for the SUL or it does not support at least one frequency band indicated infrequencyBandList for UL or it does not support at least one frequency band indicated infrequencyBandList for DL. The frequencyBandList for UL, DL and SUL is received in the SIB1.

If the SUL is not configured in the cell, the UE (100) bars the cell if it does not support at least one frequency band indicated in the frequencyBandList for the UL or it does not support at least one frequency band indicated infrequencyBandList for the DL. The frequencyBandList for the UL and the DL is received in the SIB1.

If the SUL is configured in the cell then, the UE (100) bars the cell if it does not support bandwidth of initial UL BWP for supplementary uplink indicated in the locationAndBandwidth fields of supplementary uplink or if it does not support bandwidth of initial UL BWP for uplink indicated in the locationAndBandwidth fields of uplink or if it does not support bandwidth of initial DL BWP for downlink indicated in the locationAndBandwidth fields of downlink.

If the SUL is not configured in a cell, the UE (100) bars the cell if it does not support bandwidth of initial UL BWP for uplink indicated in the locationAndBandwidth fields of uplink or if it does not support bandwidth of initial DL BWP for downlink indicated in the locationAndBandwidth fields of downlink.

The flowchart to determine camping on the cell after acquiring the SIB1, if the cell is configured with the SUL is depicted in FIGS. 6A and 6B.

Cell Camping/barring Aspects:

1> The UE (100) acquires the SIB1 from the cell.

2> If the UE (100) supports one or more of the frequency bands indicated in the frequencyBandList for downlink and if the UE (100) supports one or more of the frequency bands indicated in the frequencyBandList for uplink and if the UE (100) supports one or more of the frequency bands indicated in the frequencyBandList for supplementary uplink (if supplementary uplink is configured in the cell), and they are not downlink only bands, and 2> if the cell is the FDD cell and the UE (100) supports at least one additionalSpectrumEmission in the NR-NS-PmaxList within the frequencyBandList of FrequencyInfoUL-SIB for uplink corresponding to the UL frequency band selected by the UE (100) and the UE (100) supports at least one additionalSpectrumEmission in the NR-NS-PmaxList within the frequencyBandList of FrequencyInfoUL-SIB for supplementary uplink (if supplementary uplink is configured in the cell) corresponding to the SUL frequency band selected by the UE (100). The NR-NS-PmaxList is an information element used to configure a list of additionalPmax and additionalSpectrumEmission; and 2> if the cell is the TDD cell and the UE (100) supports at least one additionalSpectrumEmission in the NR-NS-PmaxList within the frequencyBandList of FrequencyInfoDL-SIB corresponding to the DL frequency band selected by the UE (100) and the UE (100) supports at least one additionalSpectrumEmission in the NR-NS-PmaxList within the frequencyBandList of FrequencyInfoUL-SIB for supplementary uplink (if configured) corresponding to the SUL frequency band selected by the UE (100); and 2> if the UE (100) supports the bandwidth of the initial uplink BWP for uplink and of the initial downlink BWP indicated in the locationAndBandwidth fields of uplink and downlink respectively; and 2> if the UE (100) supports the bandwidth of the initial uplink BWP for supplementary uplink (if supplementary uplink is configured in the cell) indicated in the locationAndBandwidth fields of supplementary uplink:

3> The cell is not barred. The UE (100) applies the parameters received in the SIB1.

2> else:

3> consider the cell as barred; and

3> if intraFreqReselection in MIB is set to notAllowed:

4> consider cell re-selection to other cells on the same frequency as the barred cell as not allowed.

3> else:

4> consider cell re-selection to other cells on the same frequency as the barred cell as allowed.

In another embodiment, the method can be used for camping on the cell and performing RACH.

The UE (100) bars the cell if it does not support at least one frequency band indicated in frequencyBandList for UL or it does not support at least one frequency band indicated infrequencyBandList for DL. The frequencyBandList for UL and DL is received in the SIB1.

The UE (100) bars the cell if it does not support bandwidth of initial UL BWP for uplink indicated in the locationAndBandwidth fields of uplink or if it does not support bandwidth of initial DL BWP for downlink indicated in the locationAndBandwidth fields of downlink.

Figure 7:
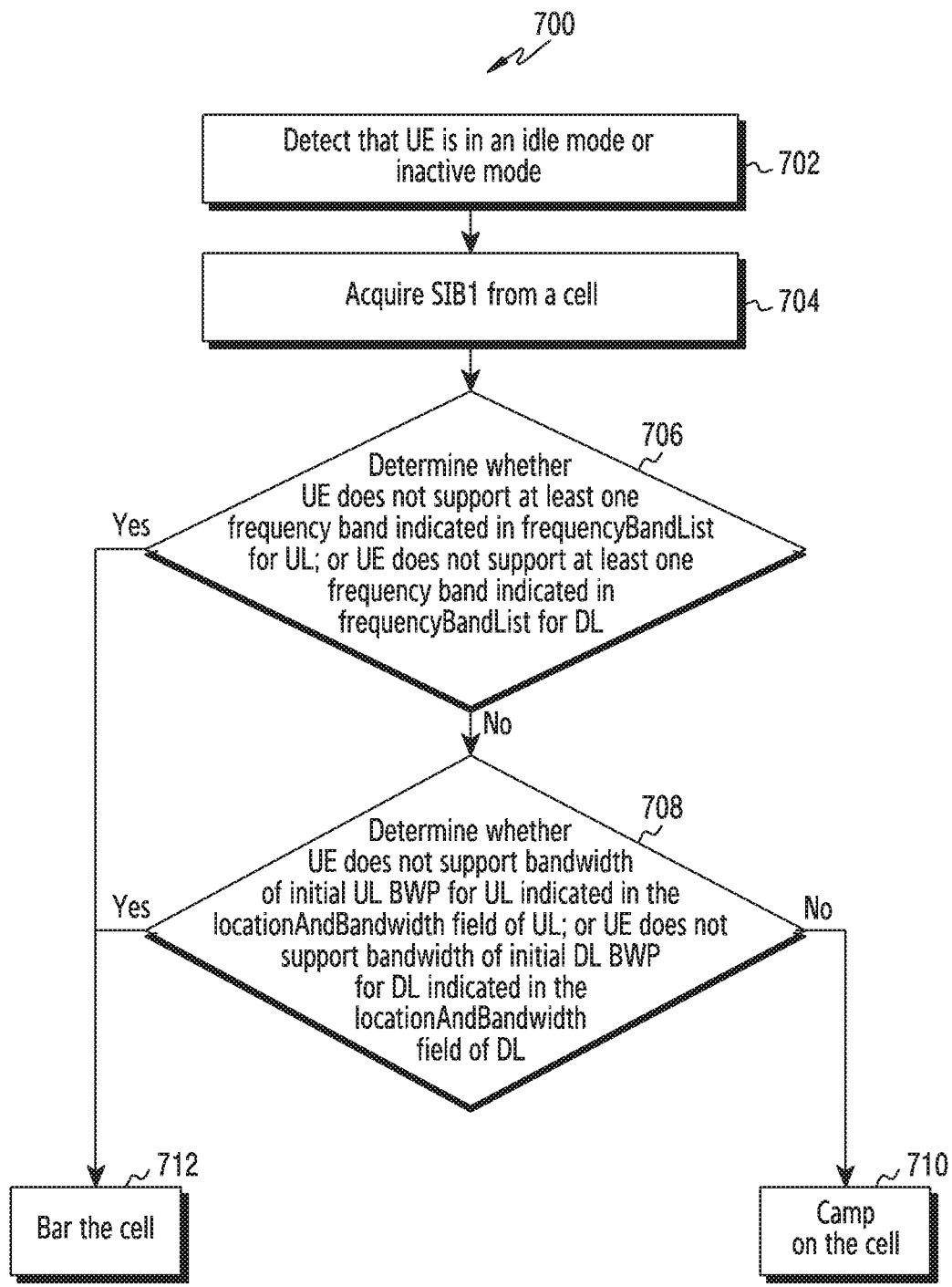
FIG. 7 is an example flowchart illustrating various operations for determining camping on cell after acquiring SIB1, regardless of the cell is configured with a supplementary uplink (SUL) or not, according to an embodiment of the disclosure.

The flowchart (700) to determine camping on the cell after acquiring the SIB1, regardless of the cell is configured with SUL or not is depicted in the FIG. 7. The operations 702-712 are performed by the processor (110).

FIG. 7 is an example flowchart illustrating various operations for determining camping on cell after acquiring SIB1, regardless of the cell is configured with a SUL or not, according to an embodiment of the disclosure.

At operation 702, the method includes detecting that the UE (100) is in the idle mode or the inactive mode. At operation 704, the method includes acquiring the SIB1 from the cell. At operation 706, the method includes determining whether the UE (100) does not support at least one frequency band indicated in the frequencyBandList for the UL, or the UE (100) does not support at least one frequency band indicated in the frequencyBandList for the DL. If the UE (100) does not support at least one frequency band indicated in the frequencyBandList for the UL, or the UE (100) does not support at least one frequency band indicated in the frequencyBandList for the DL then, at operation 712, the method includes barring the cell. If the UE (100) supports the at least one frequency band indicated in the frequencyBandList for the UL, or the UE (100) supports the at least one frequency band indicated in the frequencyBandList for the DL then, at operation 708, the method includes determining whether the UE (100) does not support bandwidth of initial UL BWP for the UL indicated in the locationAndBandwidth field of the UL; or the UE (100) does not support bandwidth of initial DL BWP for DL indicated in the locationAndBandwidth field of DL.

If the UE (100) does not support the bandwidth of initial UL BWP for UL indicated in the locationAndBandwidth field of UL or the UE (100) does not support bandwidth of initial DL BWP for DL indicated in the locationAndBandwidth field of DL then, at operation 712, the method includes barring the cell.

If the UE (100) supports the bandwidth of initial UL BWP for UL indicated in the locationAndBandwidth field of UL, or the UE (100) supports the bandwidth of initial DL BWP for DL indicated in the locationAndBandwidth field of DL then at operation 710, the method includes camping on the cell.

In an example, below are the cell camping/barring Aspects

1> The UE (100) acquires the SIB1 from the cell.

2> if the UE (100) supports one or more of the frequency bands indicated in the frequencyBandList for downlink and if the UE (100) supports one or more of the frequency bands indicated in the frequencyBandList for uplink, and they are not downlink only bands, and 2> if the cell is the FDD cell and the UE (100) supports at least one additionalSpectrumEmission in the NR-NS-PmaxList within the frequencyBandList of FrequencyInfoUL-SIB for uplink corresponding to the UL frequency band selected by the UE (100); and 2> if the cell is the TDD cell and the UE (100) supports at least one additionalSpectrumEmission in the NR-NS-PmaxList within the frequencyBandList of FrequencyInfoDL-SIB corresponding to the DL frequency band selected by the UE (100); and 2> if the UE (100) supports the bandwidth of the initial uplink BWP for uplink and of the initial downlink BWP indicated in the locationAndBandwidth fields of uplink and downlink respectively; and 3> The cell is not barred. The UE (100) applies the parameters received in the SIB1.

2> else:

3> consider the cell as barred; and

3> if intraFreqReselection in MIB is set to notAllowed:

4> consider cell re-selection to other cells on the same frequency as the barred cell as not allowed.

3> else:

4> consider cell re-selection to other cells on the same frequency as the barred cell as allowed.

SUL/UL selection for Random Access Aspects:

FIGS. 8, 9, 10, and 11 are example flowcharts illustrating various operations for determining random access (RACH) on the SUL or the NUL after camping on cell, according to various embodiments of the disclosure.

Figure 8:
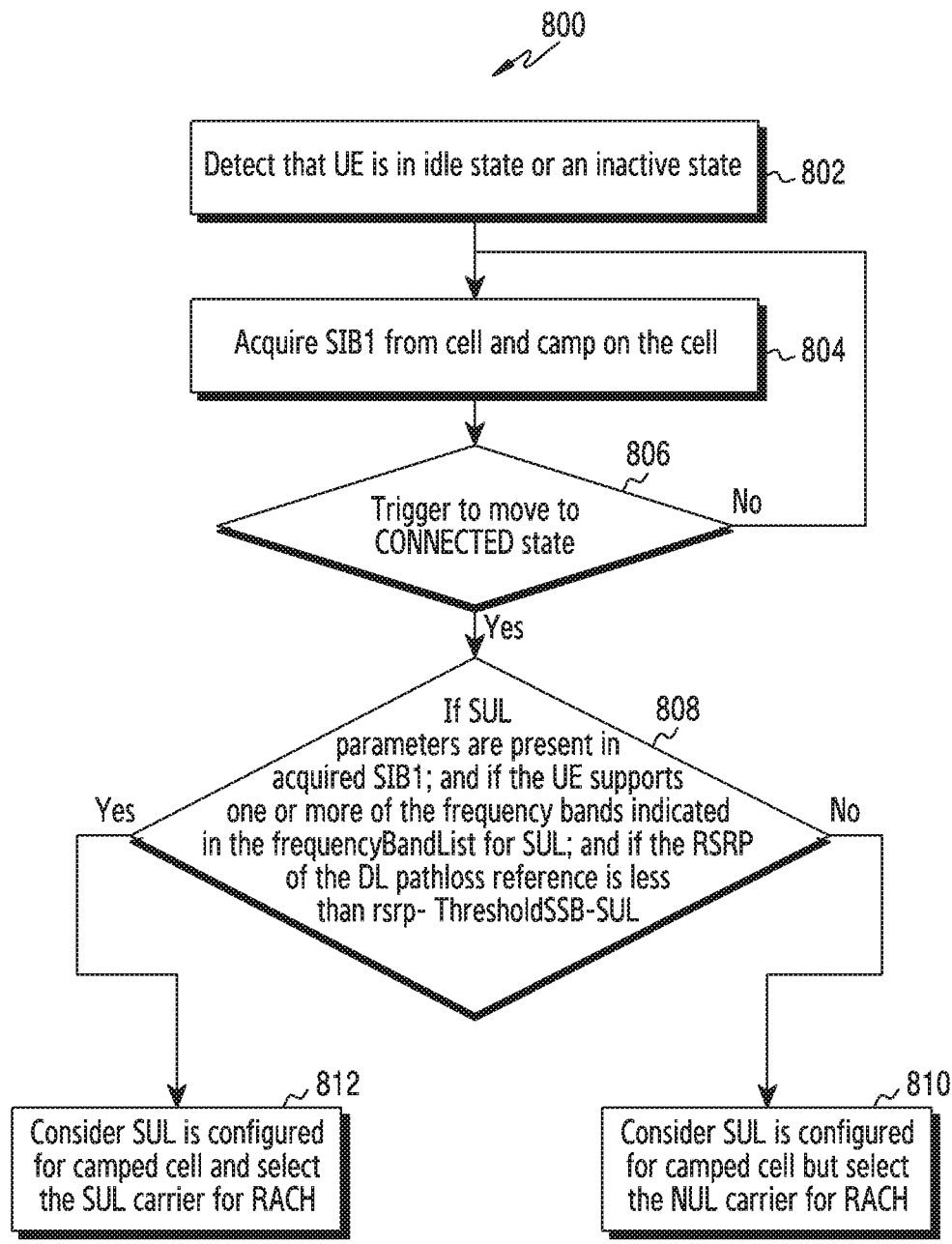
FIGS. 8, 9, 10, and 11 are example flowcharts illustrating various operations for determining random access (RACH) on the SUL or the normal uplink (NUL) after camping on cell, according to various embodiments of the disclosure.

The flowchart (800) to determine random access (RACH) on SUL or NUL after camping on cell is depicted in FIG. 8.

In an example, at operation 802, the method includes detecting that the UE (100) is in the idle state or the inactive state. At operation 804, the method includes acquiring the SIB1 from the cell and camping on the cell. At operation 806, the method includes determining whether the UE (100) triggers to move to the connected state. If the UE (100) triggers to move to the connected state then, at operation 808, the method determines that the SUL parameters are present in the acquired SIB1, and the UE supports one or more of the frequency bands indicated in the frequencyBandList for the SUL, and if the RSRP of the DL pathloss reference is less than rsrp-ThresholdSSB-SUL. If the UE (100) does not trigger to move to the connected state then, the method stops at operation 804.

If the SUL parameters are present in the acquired SIB1, the UE (100) supports one or more of the frequency bands indicated in the frequencyBandList for the SUL, and if the RSRP of the DL pathloss reference is less than rsrp-ThresholdSSB-SUL then, at operation 812, the method includes considering that the SUL is configured for the camped cell and selecting the SUL carrier for the RACH. If the SUL parameters are present in the acquired SIB1, the UE (100) support one or more of the frequency bands indicated in the frequencyBandList for the SUL, and if the RSRP of the DL pathloss reference is greater than rsrp-ThresholdSSB-SUL then, at operation 810, the method includes considering that the SUL is configured for the camped cell but selecting the NUL carrier for the RACH.

In an embodiment 1: Random access in TS 38.321
1> if the serving cell for the Random Access procedure is configured with supplementaryUplink; and
1> if the UE supports one or more of the frequency bands indicated in the frequencyBandList for supplementaryUplink; and
1> if the RSRP of the downlink path loss reference is less than rsrp-ThresholdSSB-SUL:
2> select the SUL carrier for performing Random Access procedure;
2> set the PCMAX to $P_{CMAX,f,c}$ of the SUL carrier.
1> else:
2> select the NUL carrier for performing Random Access procedure;
2> set the PCMAX to $P_{CMAX,f,c}$ of the NUL carrier.

Figure 9:
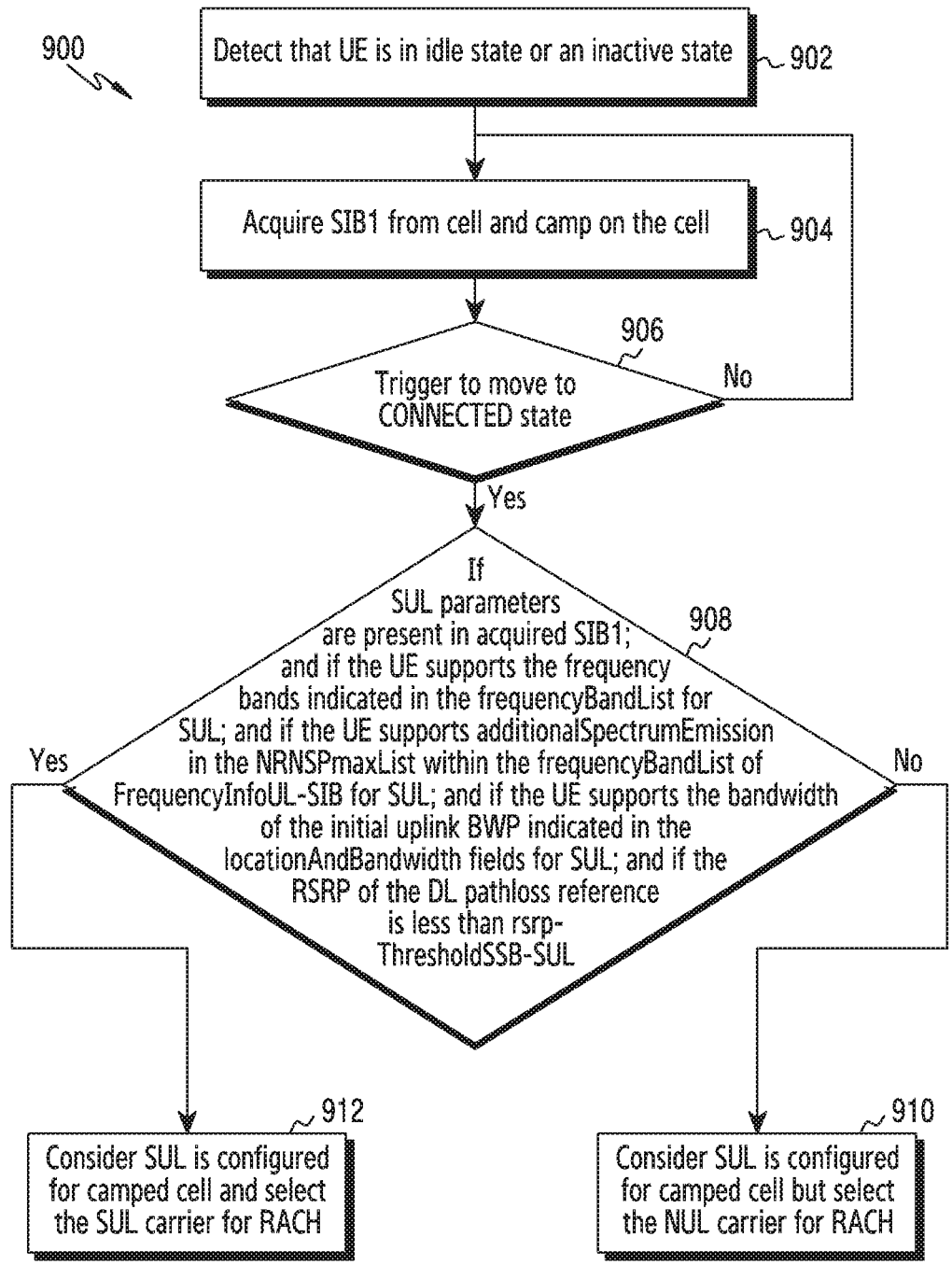

The flowchart (900) to determine random access (RACH) on SUL or NUL after camping on cell is depicted in FIG. 9, according to another embodiment.

In an example, at operation 902, the method includes detecting that the UE (100) is in the idle state or the inactive state. At operation 904, the method includes acquiring the SIB1 from the cell and camping on the cell. At operation 906, the method includes determining whether the UE (100) triggers to move to the connected state. If the UE (100) triggers to move to the connected state then, at operation 908, the UE (100) determines that the SUL parameters are present in the acquired SIB1, the UE (100) supports one or more of the frequency bands indicated in the frequencyBandList for the SUL, the UE (100) supports additionalSpectrumEmission in the NR-NSPmaxList within the frequencyBandList of FrequencyInfoUL-SIB for the SUL, if the UE (100) supports the bandwidth of the initial uplink BWP indicated in the locationAndBandwidth fields for SUL, and the RSRP of the DL pathloss reference is less than rsrp-ThresholdSSB-SUL. If the UE (100) does not trigger to move to the connected state then, the method stops at operation 904.

If the SUL parameters are present in the acquired SIB1, the UE (100) supports one or more of the frequency bands indicated in the frequencyBandList for the SUL, the UE (100) supports additionalSpectrumEmission in the NR-NSPmaxList within the frequencyBandList of FrequencyInfoUL-SIB for SUL, if the UE (100) supports the bandwidth of the initial uplink BWP indicated in the locationAndBandwidth fields for SUL, and the RSRP of the DL pathloss reference is less than rsrp-ThresholdSSB-SUL, then, at operation 912, the method includes considering that the SUL is configured for camped cell and selecting the SUL carrier for the RACH.

If the SUL parameters are present in the acquired SIB1, the UE (100) support one or more of the frequency bands indicated in the frequencyBandList for the SUL, the UE (100) supports the additionalSpectrumEmission in the NR-NSPmaxList within the frequencyBandList of FrequencyInfoUL-SIB for SUL, the UE (100) supports the bandwidth of the initial uplink BWP indicated in the locationAndBandwidth fields for SUL, and the RSRP of the DL pathloss reference is greater than rsrp-ThresholdSSB-SUL then, at operation 910, the method includes considering that the SUL is configured for camped cell but selecting the NUL carrier for the RACH.

In an embodiment: Random access in TS 38.321:
1> if the Serving Cell for the Random Access procedure is configured with supplementaryUplink; and
1> if the UE (100) supports one or more of the frequency bands indicated in the frequencyBandList for supplementaryUplink; and
1> if the UE (100) supports at least one additionalSpectrumEmission in the NR-NS-PmaxList within the frequencyBandList of FrequencyInfoUL-SIB for supplementaryUplink, and
1> if the UE (100) supports the bandwidth of the initial uplink BWP indicated in the locationAndBandwidth fields for supplementaryUplink; and
1> if the RSRP of the downlink pathloss reference is less than rsrp-ThresholdSSB-SUL:
2> select the SUL carrier for performing Random Access procedure;
2> set the PCMAX to $P_{CMAX,f,c}$ of the SUL carrier.
1> else:
2> select the NUL carrier for performing Random Access procedure;
2> set the PCMAX to $P_{CMAX,f,c}$ of the NUL carrier.

Figure 10:
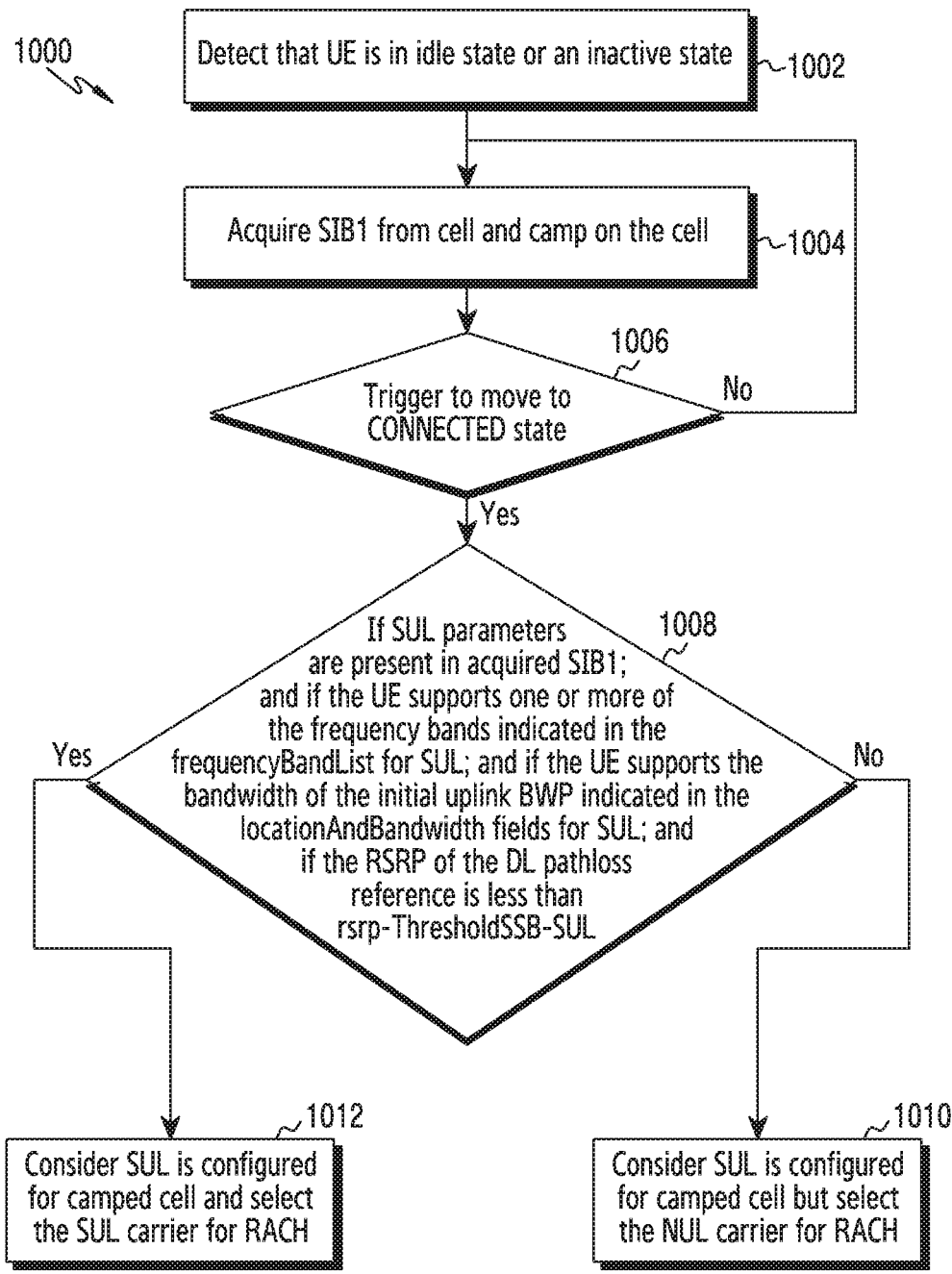

The flowchart (1000) to determine the RACH on the SUL or the NUL after camping on cell is depicted in FIG. 10, according to yet another embodiment.

In an example, at operation 1002, the method includes detecting that the UE (100) is in the idle state or the inactive state. At operation 1004, the method includes acquiring the SIB1 from the cell and camping on the cell. At operation 1006, the method includes determining whether the UE (100) triggers to move to the connected state. If the UE (100) triggers to move to the connected state then, at operation 1008, the method includes that the SUL parameters are present in the acquired SIB1, and if the UE (100) supports one or more of the frequency bands indicated in the frequencyBandList for the SUL, and if the UE (100) supports the bandwidth of the initial uplink BWP indicated in the locationAndBandwidth fields for SUL, and if the RSRP of the DL pathloss reference is less than rsrp-ThresholdSSB-SUL.

If the SUL parameters are present in the acquired SIB1, and if the UE (100) supports one or more of the frequency bands indicated in the frequencyBandList for the SUL, and if the UE (100) supports the bandwidth of the initial uplink BWP indicated in the locationAndBandwidth fields for SUL, and if the RSRP of the DL pathloss reference is less than rsrp-ThresholdSSB-SUL then, at operation 1012, the method includes considering that the SUL is configured for camped cell and selecting the SUL carrier for the RACH.

If the SUL parameters are present in the acquired SIB1, and if the UE (100) supports one or more of the frequency bands indicated in the frequencyBandList for the SUL, and if the UE (100) support the bandwidth of the initial uplink BWP indicated in the locationAndBandwidth fields for SUL, and if the RSRP of the DL pathloss reference is greater than rsrp-ThresholdSSB-SUL then, at operation 1010, the method includes considering that the SUL is configured for camped cell but selecting the NUL carrier for the RACH.

In an embodiment: Random access in TS 38.321:
1> if the Serving Cell for the Random Access procedure is configured with supplementaryUplink; and
1> if the UE (100) supports one or more of the frequency bands indicated in the frequencyBandList for supplementaryUplink; and 1> if the UE (100) supports the bandwidth of the initial uplink BWP indicated in the locationAndBandwidth fields for supplementaryUplink; and
   1> if the RSRP of the downlink pathloss reference is less than rsrp-ThresholdSSB-SUL:
      2> select the SUL carrier for performing Random Access procedure;
      2> set the PCMAX to $P_{CMAX,f,c}$ of the SUL carrier.
   1> else:
      2> select the NUL carrier for performing Random Access procedure;
      2> set the PCMAX to $P_{CMAX,f,c}$ of the NUL carrier.

Figure 11:
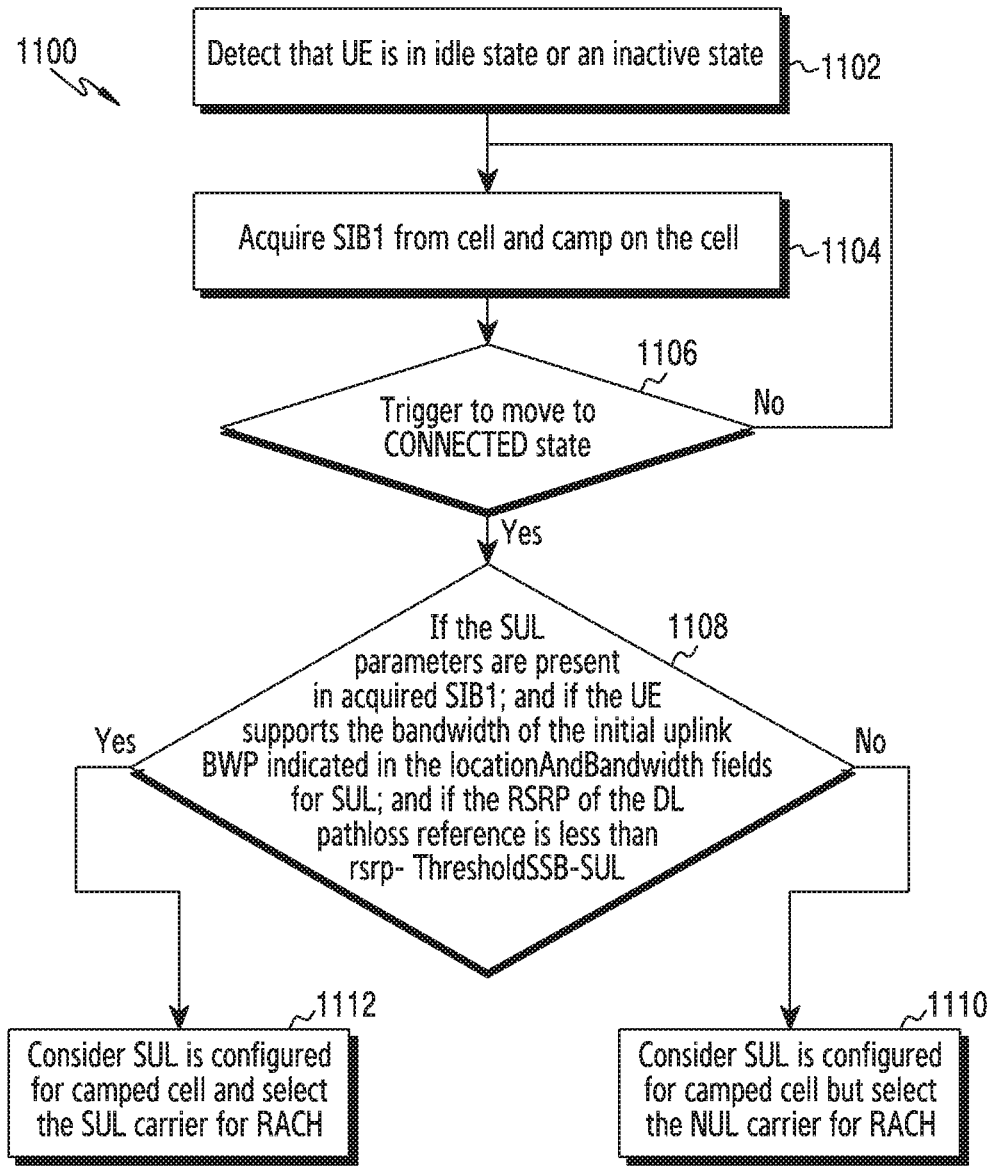

The flowchart (1100) to determine random access (RACH) on SUL or NUL after camping on cell is depicted in the FIG. 11, according to yet another embodiment.

In an example, at operation 1102, the method includes detecting that the UE (100) is in the idle state or the inactive state. At operation 1104, the method includes acquiring the SIB1 from the cell and camping on the cell. At operation 1106, the method includes determining whether the UE (100) triggers to move to the connected state. If the UE (100) triggers to move to the connected state then, at operation 1108, the method includes that the SUL parameters are present in the acquired SIB1, and if the UE (100) supports the bandwidth of the initial uplink BWP indicated in the locationAndBandwidth fields for the SUL, and if the RSRP of the DL pathloss reference is less than rsrp-ThresholdSSB-SUL. If the UE (100) does not trigger to move to the connected state then, the method stops at operation 1104.

If the SUL parameters are present in the acquired SIB1, and if the UE (100) supports the bandwidth of the initial uplink BWP indicated in the locationAndBandwidth fields for the SUL, and if the RSRP of the DL pathloss reference is less than rsrp-ThresholdSSB-SUL then, at operation 1112, the method includes considering that the SUL is configured for camped cell and selecting the SUL carrier for the RACH.

If the SUL parameters are present in the acquired SIB1, and if the UE (100) support the bandwidth of the initial uplink BWP indicated in the locationAndBandwidth fields for the SUL, and if the RSRP of the DL pathloss reference is greater than rsrp-ThresholdSSB-SUL then, at operation 1110, the method includes considering that the SUL is configured for camped cell but selecting the NUL carrier for the RACH.

In an embodiment: Random access in TS 38.321
1> if the Serving Cell for the Random Access procedure is configured with supplementaryUplink; and
   1> if the UE (100) supports the bandwidth of the initial uplink BWP indicated in the locationAndBandwidth fields for supplementaryUplink; and
   1> if the RSRP of the downlink pathloss reference is less than rsrp-ThresholdSSB-SUL:
      2> select the SUL carrier for performing Random Access procedure;
      2> set the PCMAX to $P_{CMAX,f,c}$ of the SUL carrier.
   1> else:
      2> select the NUL carrier for performing Random Access procedure;
      2> set the PCMAX to $P_{CMAX,f,c}$ of the NUL carrier.

The method can be used for camping on the cell and performing RACH:

If SUL is configured, the UE (100) camps on the cell if it supports SUL or UL frequency band and DL frequency band according to FIGS. 6A and 6B.

If SUL is not configured, the UE (100) camps on cell if it supports UL frequency band and DL frequency band according to FIG. 7.

SUL/UL selection for Random Access Aspects:
1> if the Serving Cell for the Random Access procedure is configured with supplementaryUplink; and
   1> if the UE (100) supports one or more of the frequency bands indicated in the frequencyBandList for supplementaryUplink; and
   1> if the UE (100) supports one or more of the frequency bands indicated in the frequencyBandList for Uplink:
      2> if the RSRP of the downlink pathloss reference is less than rsrp-ThresholdSSB-SUL:
         3> select the SUL carrier for performing Random Access procedure;
         3> set the PCMAX to $P_{CMAX,f,c}$ of the SUL carrier.
      2> else:
         3> select the NUL carrier for performing Random Access procedure;
         3> set the PCMAX to $P_{CMAX,f,c}$ of the NUL carrier.
   1> else if the UE (100) supports one or more of the frequency bands indicated in the frequencyBandList for supplementaryUplink:
      2> select the SUL carrier for performing Random Access procedure;
      2> set the PCMAX to $P_{CMAX,f,c}$ of the SUL carrier.
   1> else if the UE supports one or more of the frequency bands indicated in the frequencyBandList for Uplink
      2> select the NUL carrier for performing Random Access procedure;
      2> set the PCMAX to $P_{CMAX,f,c}$ of the NUL carrier.

p-Max/additionalPmax Selection
If SUL is not configured in a cell:
1> apply the first listed additionalSpectrumEmission which it supports among the values included in NR-NS-PmaxList corresponding to the frequency band selected by the UE within frequencyBandList of FrequencyInfoUL-SIB for FDD or within frequencyBandList of FrequencyInfoDL-SIB for TDD;
1> if the additionalPmax is present in the same entry of the selected additionalSpectrumEmission within NR-NS-PmaxList:
   2> apply the additionalPmax;
   2> else:
   2> apply the p-Max;
If SUL is configured:
When UL is used for uplink transmission:
1> apply the first listed additionalSpectrumEmission which it supports among the values included in NR-NS-PmaxList corresponding to the frequency band selected by the UE within frequencyBandList of FrequencyInfoUL-SIB for FDD or within frequencyBandList of FrequencyInfoDL-SIB for TDD;
1> if the additionalPmax is present in the same entry of the selected additionalSpectrumEmission within NR-NS-PmaxList:
   2> apply the additionalPmax;
   2> else:
   2> apply the p-Max;
When SUL is used for uplink transmission:
1> apply the first listed additionalSpectrumEmission which it supports among the values included in NR-NS-PmaxList corresponding to the frequency band selected by the UE within frequencyBandList for supplementary uplink;
1> if the additionalPmax is present in the same entry of the selected additionalSpectrumEmission within NR-NS-PmaxList:
   2> apply the additionalPmax;
   2> else:
   2> apply the p-Max;

The embodiments disclosed herein can be implemented through at least one software program running on at least one non-transitory hardware device and performing network management functions to control the elements.

The various actions, acts, blocks, steps, or the like in the flow charts (400-1100) may be performed in the order presented, in a different order or simultaneously. Further, in some embodiments, some of the actions, acts, blocks, steps, or the like may be omitted, added, modified, skipped, or the like without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a cell provided by a base station, a system information block (SIB) wherein the SIB includes a frequency band list field, a location, and bandwidth field for an initial uplink bandwidth part (BWP), and a reference signal received power (RSRP) threshold for a synchronization signal block (SSB);
   in case that (i) a supplementary uplink (SUL) parameter for the cell is received in the SIB, (ii) the terminal supports one or more frequency bands included in the frequency band list field of SUL, (iii) the terminal supports at least one additional spectrum emission included in the frequency band list field of the SUL, and (iv) the terminal supports a bandwidth included in the location and bandwidth field of the SUL, identifying that a SUL carrier is configured for the cell;
   performing, in case that a RSRP of a downlink pathloss reference is less than the RSRP threshold, a random access procedure on the SUL carrier; and
   performing, in case that the RSRP of the downlink pathloss reference is more than or equal to the RSRP threshold, the random access procedure on a normal uplink (NUL) carrier.

2. The method of claim 1, wherein the identifying whether the SUL carrier is configured for the cell comprises:
   identifying whether the terminal supports the one or more frequency bands included in the frequency band list field of the SUL,
   identifying whether the terminal supports the at least one additional spectrum emission included in the frequency band list field of the SUL, and
   identifying whether the terminal supports the bandwidth included in the location and bandwidth field of the SUL.

3. The method of claim 1, wherein, in case that the terminal supports the one or more frequency bands included in the frequency band list field of the SUL, the terminal supports the at least one additional spectrum emission included in the frequency band list field of the SUL, and the terminal supports the bandwidth in the location and bandwidth field of the SUL, the cell is not barred.

4. The method of claim 1, further comprising:
   applying a first listed additional spectrum emission of the at least one additional spectrum emission.

5. The method of claim 4, further comprising:
   in case that an additional power max included in the frequency band list field is in a same entry with the first listed additional spectrum emission, applying the additional power max to the SUL.

6. A terminal in a wireless communication system, the terminal comprising:
   at least one transceiver; and
   at least one processor operably coupled to the at least one transceiver, wherein the at least one processor is configured to:
      receive, from a cell provided by a base station, a system information block (SIB) wherein the SIB includes a frequency band list field, a location, and bandwidth field for an initial uplink bandwidth part (BWP), and a reference signal received power (RSRP) threshold for a synchronization signal block (SSB),
      in case that (i) a supplementary uplink (SUL) parameter for the cell is received in the SIB, (ii) the terminal supports one or more frequency bands included in the frequency band list field of SUL, (iii) the terminal supports at least one additional spectrum emission included in the frequency band list field of the SUL, and (iv) the terminal supports a bandwidth included in the location and bandwidth field of the SUL, identify that a SUL carrier is configured for the cell,
      perform, in case that a RSRP of a downlink pathloss reference is less than the RSRP threshold, a random access procedure on the SUL carrier, and
      perform, in case that the RSRP of the downlink pathloss reference is more than or equal to the RSRP threshold, the random access procedure on a normal uplink (NUL) carrier.

7. The terminal of claim 6, wherein the at least one processor is further configured to:
   identify whether the terminal supports the one or more frequency bands included in the frequency band list field of the SUL,
   identify whether the terminal supports the at least one additional spectrum emission included in the frequency band list field of the SUL, and
   identify whether the terminal supports the bandwidth included in the location and bandwidth field of the SUL.

8. The terminal of claim 6,
   wherein, in case that the terminal supports the one or more frequency bands included in the frequency band list field of the SUL, the terminal supports the at least one additional spectrum emission included in the frequency band list field of the SUL, and the terminal supports the bandwidth in the location and bandwidth field of the SUL, the cell is not barred.

9. The terminal of claim 6, wherein the at least one processor is further configured to:
   apply a first listed additional spectrum emission of the at least one additional spectrum emission.

10. The terminal of claim 9, wherein the at least one processor is further configured to:
    in case that an additional power max included in the frequency band list field is in a same entry with the first listed additional spectrum emission, apply the additional power max to the SUL.

* * * * *